(12) United States Patent  
Yen et al.

(10) Patent No.: US 9,997,906 B1
(45) Date of Patent: Jun. 12, 2018

(54) OVER-CURRENT PROTECTION DEVICE

(71) Applicant: POLYTRONICS TECHNOLOGY CORP., Hsinchu (TW)

(72) Inventors: Hsiu Che Yen, Taoyuan (TW); Yung Hsien Chang, Douliu (TW); Zhen Yu Dong, Tainan (TW); Yao Te Chang, Linnei Township, Yunlin County (TW); David Shau Chew Wang, Taipei (TW)

(73) Assignee: Polytronics Technology Corp., Hsinchu (TW)

( * ) Notice: Subject to any disclaimer, the term of this patent is extended or adjusted under 35 U.S.C. 154(b) by 0 days. days.

(21) Appl. No.: 15/711,546

(22) Filed: Sep. 21, 2017

(51) Int. Cl.
| | |
|---|---|
| *H01C 7/10* | (2006.01) |
| *H02H 9/02* | (2006.01) |
| *H01C 7/02* | (2006.01) |
| *C09K 5/14* | (2006.01) |
| *C08L 27/16* | (2006.01) |
| *C08L 23/06* | (2006.01) |

(52) U.S. Cl.
CPC ............. *H02H 9/026* (2013.01); *C08L 23/06* (2013.01); *C08L 27/16* (2013.01); *C09K 5/14* (2013.01); *H01C 7/021* (2013.01); *H01C 7/027* (2013.01); *H01C 7/028* (2013.01); *C08L 2207/062* (2013.01)

(58) Field of Classification Search
CPC ........ H01C 7/021; H01C 7/027; H01C 7/028; H02H 9/026
USPC .................................................. 338/22 R, 13
See application file for complete search history.

(56) References Cited

U.S. PATENT DOCUMENTS

| | | | |
|---|---|---|---|
| 7,286,038 B1 | 10/2007 | Wang et al. | |
| 7,352,272 B2 * | 4/2008 | Wang ....................... | H01B 1/22 252/511 |
| 7,382,224 B2 * | 6/2008 | Wang ..................... | H01C 7/027 219/548 |
| 8,058,966 B2 * | 11/2011 | Koyama .............. | H01C 1/1406 219/553 |
| 2004/0056753 A1 * | 3/2004 | Chiang .................... | G01K 3/14 338/22 R |

(Continued)

FOREIGN PATENT DOCUMENTS

CN         101887766 A    11/2010

*Primary Examiner* — Kyung Lee
(74) *Attorney, Agent, or Firm* — Muncy, Geissler, Olds & Lowe, P.C.

(57) ABSTRACT

An over-current protection device comprises first and second electrode layers and a PTC material layer laminated therebetween. The PTC material layer has a resistivity less than 0.05 Ω·cm and comprises a polymer matrix, a conductive ceramic filler and a carbon-containing conductive filler. The polymer matrix comprises a fluoropolymer having a melting point higher than 150° C. and comprises 50-60% by volume of the PTC material layer. The conductive ceramic filler having a resistivity less than 500μΩ·cm is dispersed in the polymer matrix and comprises 40-45% by volume of the PTC material layer. The carbon-containing conductive filler is dispersed in the polymer matrix and comprises 0.5-5% by volume of the PTC material layer. At 25° C., a ratio of a hold current to an area of the over-current protection device is 0.21-0.3 A/mm², and a ratio of an endurable power to the area of the over-current protection device is 4.8-7.2 W/mm².

10 Claims, 1 Drawing Sheet

(56) References Cited

U.S. PATENT DOCUMENTS

| | | | | |
|---|---|---|---|---|
| 2007/0057759 | A1* | 3/2007 | Koyama | H01C 1/1406 338/22 R |
| 2012/0182118 | A1* | 7/2012 | Tsai | H01C 7/13 338/22 R |
| 2016/0035468 | A1* | 2/2016 | Lo | H01C 7/027 338/22 R |
| 2017/0018339 | A1* | 1/2017 | Wang | H01C 7/021 |

* cited by examiner

OVER-CURRENT PROTECTION DEVICE

BACKGROUND OF THE INVENTION

(1) Field of the Invention

The present application relates to an over-current protection device, and more specifically, to an over-current protection device with a high hold current.

(2) Description of the Related Art

Because the resistance of conductive composite materials having a positive temperature coefficient (PTC) characteristic is very sensitive to temperature variation, it can be used as the material for current sensing devices, and has been widely applied to over-current protection devices or circuit devices. The resistance of the PTC conductive composite material remains extremely low at normal temperatures, so that the circuit or cell can operate normally. However, when an over-current or an over-temperature event occurs in the circuit or cell, the resistance will instantaneously increase to a high resistance state (e.g. at least above $10^4 \Omega$), which is the so-called trip. Therefore, the over-current will be eliminated so as to protect the cell or the circuit device.

Over-current protection devices applied in high temperature environments must meet the following two criteria: (1) The Time-to-Trip (TtT) cannot be too fast, for example, it must be larger than 2 seconds at specific temperature, current and voltage; and (2) it must be capable of being tripped at room temperature of 25° C. and a current of 12 A. Generally, the over-current protection devices are of small sizes, and the PTC device using carbon black as the conductive fillers cannot easily meet the above requirements. Experiments using nickel powder as the conductive filler have also been conducted. However, hydrofluoric acid is generated when the nickel powder is mixed with fluoropolymer at a high temperature, and thus nickel powder cannot be used.

Over-current protection devices applied to motor vehicles must have superior heat dissipation capability because the vehicles are often insolated under strong sunshine. Conventionally, the resistance of the device using carbon black as the conductive filler is high, thus the hold current is small and heat is easily generated. U.S. Pat. No. 7,286,038 discloses the use of titanium carbide as the thermal conductive filler to obtain a maximum hold current per unit area of 0.2 A/mm$^2$ and an endurable voltage of 15V. However, it is observed that larger hold current and voltage endurance are required recently.

In view of the above, the hold current and the voltage endurance of an over-current protection device have to be increased for high-temperature applications.

SUMMARY OF THE INVENTION

The present application provides an over-current protection device with a view to effectively increasing hold current, heat dissipation efficiency and voltage endurance by introducing a fluoropolyrer, a conductive ceramic filler and a carbon-containing filler. The so-called hold current is the maximum endurable current without trip. Accordingly, the over-current protection device of the present application can be used for high-temperature applications such as automotive vehicles.

In accordance with an embodiment of the present application, an over-current protection device comprises a first electrode layer, a second electrode layer and a PTC material layer laminated therebetween. The PTC material layer has a resistivity less than 0.05 Ω·cm and comprises a polymer matrix, a conductive ceramic filler and a carbon-containing conductive filler. The polymer matrix comprises at least one fluoropolymer having a melting point higher than 150° C. and comprises 50-60% by volume of the PTC material layer. The conductive ceramic filler having a resistivity less than 500μΩ·cm is dispersed in the polymer matrix and comprises 40-45% by volume of the PTC material layer. The carbon-containing conductive filler is dispersed in the polymer matrix and comprises 0.5-5% by volume of the PTC material layer. At 25° C., a ratio of a hold current to an area of the over-current protection device is 0.21-0.3 A/mm$^2$, and a ratio of an endurable power to the area of the over-current protection device is 4.8-7.2 W/mm$^2$.

In an embodiment, the fluoropolymer is selected from the group consisting of polyvinylidene fluoride (PVDF), ethylene-tetra-fluoro-ethylene (ETFE), poly(tetrafluoroethylene) (PTFE), tetrafluoroethylene-hexafluoro-propylene copolymer (FEP), ethylene-tetrafluoroethylene copolymer (PETFE), perfluoroalkoxy modified tetrafluoroethylenes (PFA), poly(chlorotri-fluorotetrafluoroethylene)(PCTFE), vinylidene fluoride-tetrafluoroethylene copolymer (VF-2-TFE), poly(vinylidene fluoride), tetrafluoroethylene-perfluorodioxole copolymer, vinylidene fluoride-hexafluoropropylene copolymer, and vinylidene fluoride-hexafluoropropylene-tetrafluoroethylene terpolymer.

In an embodiment, the conductive ceramic filler is selected from the group consisting of tungsten carbide, titanium carbide, vanadium carbide, zirconium carbide, niobium carbide, tantalum carbide, molybdenum carbide, hafnium carbide, titanium boride, vanadium boride, zirconium boride, niobium boride, molybdenum boride, hafnium boride and zirconium nitride.

In an embodiment, the carbon-containing conductive filler comprises carbon black.

In an embodiment, the polymer matrix further comprises high-density polyethylene (HDPE).

In an embodiment, the polymer matrix comprises a plurality of fluoropolymers with different melting temperatures in which the highest melting temperature is higher than the lowest melting temperature by 4-15° C.

In an embodiment, the polymer matrix comprises a plurality of fluoropolymers with different melting temperatures in which neighboring melting temperatures have a difference of 3-8° C.

In an embodiment, the polymer matrix comprises a plurality of polyvinylidene fluorides with different melting temperatures.

In an embodiment, the over-current protection device can pass a cycle life test at 24V and 50 A by 100 cycles without burning or blowing out.

In an embodiment, the over-current protection device has a time-to-trip (TtT) larger than two seconds at 85° C., 16V and 20 A.

The over-current protection device comprising a fluoropolymer can be used for high-temperature applications, in which specific percentages of the polymer matrix, the conductive ceramic filler and the carbon-containing filler are employed to achieve high hold current, high endurable power and high voltage endurance (≥24V).

BRIEF DESCRIPTION OF THE DRAWINGS

The present application will be described according to the appended drawings in which.

DETAILED DESCRIPTION OF THE INVENTION

The making and using of the presently preferred illustrative embodiments are discussed below in detail. It should be appreciated, however, that the present application provides many applicable inventive concepts that can be embodied in a wide variety of specific contexts. The specific illustrative embodiments discussed are merely illustrative of specific ways to make and use the invention, and do not limit the scope of the invention.

Table 1 shows the composition to make a PTC material layer by volume percentages in accordance with Embodiments (E1-E5) of the present application and Comparative Examples (C1-C3). The carbon black (CB) serving as a conductive filler uses RAVEN 430 ULTRA of Columbian Chemical Company. The tungsten carbide (WC) ceramic powder serving as a conductive filler uses WP-301 of Micron Metals, Inc. In a polymer matrix, high-density polyethylene (HDPE) uses TAISOX HDPE-8010 of Formosa Plastics, Inc, and polyvinylidene fluoride (PVDF) uses Kynar 740, Kynar 761, Kureha 850 and Kureha 1100 with melting temperatures of 165° C., 168° C., 173° C. and 175° C., respectively. E1 and E2 comprise tungsten carbide, carbon black and four PVDF of different melting temperatures. E3 comprises tungsten carbide and four PVDF of different melting temperatures, excluding carbon black. E4 and E5 comprise tungsten carbide, carbon black, PVDF 740 and HDPE. The hold current becomes lower as temperature rises, i.e., thermal derating effect. HDPE has a lower melting temperature of about 130° C. and PVDF has a higher melting temperature of about 165-175° C., and therefore the use of PVDF mitigates the decline of the hold current. C1 comprises carbon black and PVDF 740, excluding tungsten carbide. C2 comprises tungsten carbide, carbon black and PVDF 740. C3 comprises tungsten carbide, carbon black and four PVDF with different melting temperatures, and has a larger amount of carbon black and a less amount of the tungsten carbide in comparison with C2.

TABLE 1

|    | WC    | CB   | PVDF 740 | PVDF 761 | PVDF 850 | PVDF 1100 | HDPE  |
|----|-------|------|----------|----------|----------|-----------|-------|
| E1 | 41%   | 3%   | 17%      | 12%      | 17%      | 10%       | —     |
| E2 | 41%   | 3.5% | 11.5%    | 16%      | 16%      | 12%       | —     |
| E3 | 44%   | 0.5% | 16.5%    | 13%      | 13%      | 13%       | —     |
| E4 | 40%   | 5%   | 49%      | —        | —        | —         | 6%    |
| E5 | 41.7% | 2.8% | 6.2%     | —        | —        | —         | 49.3% |
| C1 | —     | 32%  | 68%      | —        | —        | —         | —     |
| C2 | 41.7% | 2.8% | 55.5%    | —        | —        | —         | —     |
| C3 | 38.6% | 6.4% | 11%      | 16%      | 16%      | 12%       | —     |

The materials of E1-E5 and C1-C3 are put into HAAKE twin screw blender with the volume percentages as shown above for blending. The blending temperature is 215° C., the time for pre-mixing is 3 minutes, and the blending time is 15 minutes.

Figure 1:
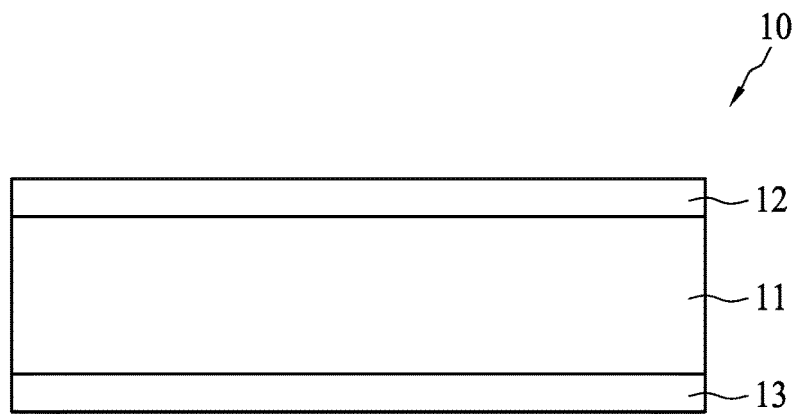
FIG. 1 shows an over-current protection device in accordance with an embodiment of the present application.
Figure 2:
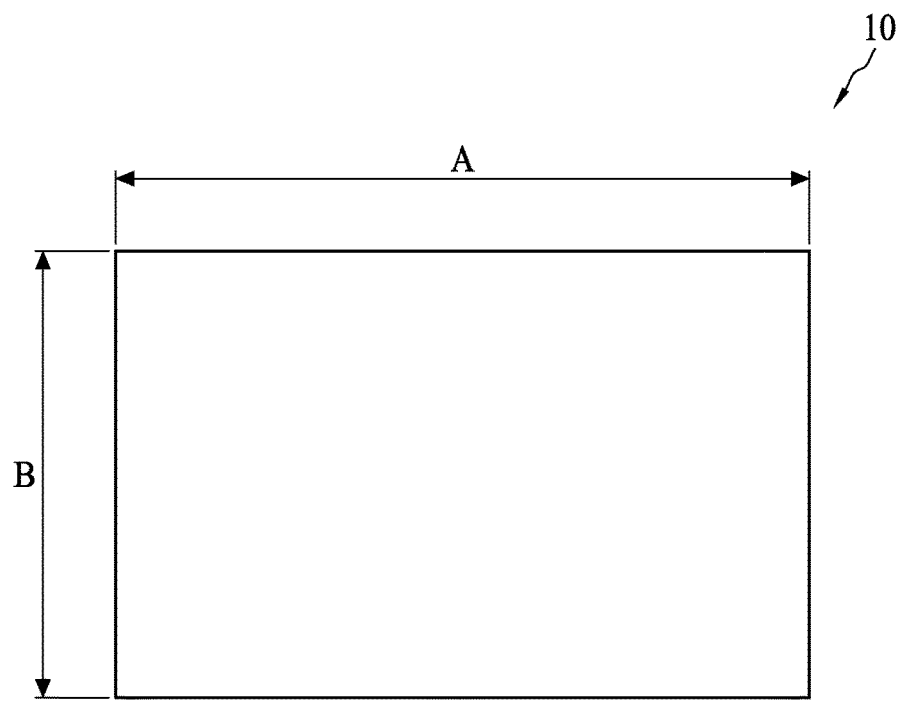
FIG. 2 shows the top view of the over-current protection device shown in FIG. 1.

The conductive polymer after being blended is pressed into a sheet by a hot press machine at a temperature of 210° C. and a pressure of 150 kg/cm$^2$. The sheet is then cut into pieces of about 20 cm×20 cm, and two nickel-plated copper foils are laminated to two sides of the sheet with the hot press machine at a temperature of 210° C. and a pressure of 150 kg/cm$^2$. Then, the sheet with the nickel-plated copper foils is punched into PTC chips as shown in FIG. 1, which is an over-current protection device 10 of the present invention. The over-current protection device 10 comprises a PTC material layer 11 formed by the conductive polymer, and a first electrode layer 12 and a second electrode layer 13 formed by the nickel-plated copper foils. The PTC material layer 11 has a thickness of about 0.28-0.77 mm. FIG. 2 is a top view of the over-current protection device 10 in FIG. 1, and the area "A×B" of the over-current protection device 10, which is equivalent to the area of the PTC material layer 11, is about 32.15-70 mm$^2$.

In an embodiment, a solder paste is daubed on the outer surfaces of the first and second electrode layers 12 and 13, and two copper electrodes with a thickness of 0.5 mm are respectively disposed on the solder paste on the first and second electrode layers 12 and 13 as external leads, and then the assembled device is subjected to a reflow soldering process at 300° C. so as to form a PTC device of an axial-type or a radial-leaded type. Alternatively, notches may be made on the first and second electrode layers by etching and followed by making insulating layers, outer electrode layers and conductive connecting holes to form a PTC device of surface-mountable device (SMD) type.

The following measurements are performed by taking five PTC devices as samples for each group having different compositions: (1) an initial resistance Ri; (2) a time-to-trip (TtT) at 85° C., 16V and 20 A; (3) a hold current at 25° C. and 24V; and (4) a cycle life test (on: 10 seconds; off: 60 seconds) at 24V and 50 A by 100 cycles. Each cycle comprises a process of trip and recovery. The resistivity ρ of the material can be calculated upon Ri and the thickness of the PTC material layer. The hold current per unit area (A/mm$^2$) and endurable power per unit area (W/mm$^2$) can be calculated upon hold current value, the area of the device, and the testing voltage. Table 2 and Table 3 show the test results of E1-E5 and C1-C3.

TABLE 2

|    | Ri (mΩ) | ρ (Ω-cm) | Thickness (mm) | Area (mm$^2$) | TtT @ 85° C. (16 V/20 A) (sec) |
|----|---------|----------|----------------|---------------|--------------------------------|
| E1 | 2.87    | 0.0287   | 0.7            | 70            | 10.6                           |
| E2 | 3       | 0.03     | 0.7            | 70            | 8.4                            |
| E3 | 2.78    | 0.0306   | 0.77           | 70            | 10.51                          |
| E4 | 4.79    | 0.0385   | 0.35           | 32.15         | 0.48                           |
| E5 | 3.1     | 0.0249   | 0.4            | 32.15         | 0.88                           |
| C1 | 105     | 0.9145   | 0.28           | 32.15         | 0.015                          |
| C2 | 2.96    | 0.0326   | 0.77           | 70            | 10.6                           |
| C3 | 3.57    | 0.0393   | 0.77           | 70            | 6.77                           |

TABLE 3

|    | I-hold @ 25° C. (A) | I-hold @ (25° C./area) (A/mm$^2$) | Cycle life test @ 24 V/50 A | Endurable power/area (W/mm$^2$) |
|----|---------------------|-----------------------------------|-----------------------------|--------------------------------|
| E1 | 16.4                | 0.234                             | Pass                        | 5.62                           |
| E2 | 15.9                | 0.227                             | Pass                        | 5.45                           |
| E3 | 15.2                | 0.217                             | Pass                        | 5.21                           |
| E4 | 7.92                | 0.254                             | Pass                        | 6.1                            |
| E5 | 8.6                 | 0.267                             | Pass                        | 6.41                           |
| C1 | 2.6                 | 0.08                              | Pass                        | 1.92                           |
| C2 | 14.2                | 0.203                             | Fail                        | 4.87                           |
| C3 | 12                  | 0.171                             | Pass                        | 4.11                           |

In Table 2, C1 does not contain tungsten carbide, the initial resistance Ri is greater than 100 mΩ, and the hold current at 25° C. is low. The hold current per unit area is only 0.08 A/mm². C2 uses a small amount of carbon black, and it fails and blows in the cycle life test of 100 cycles, indicating inferior voltage endurance. Although E5 and C2 have equivalent amount of carbon black, E5 pass the cycle life test of 100 cycles through adequate polymer composition adjustment with PVDF and a large amount of HDPE. C3 contains a larger amount of carbon black (>5%) and a less amount of tungsten carbide (<40%), resulting in low hold current at 25° C. and the hold current per unit area is only 0.171 A/mm². E1-E5 use a large amount of tungsten carbide and an adequate amount of carbon black to obtain a resistivity of less than 0.05 Ω·cm and a hold current per unit area of equal to or greater than 0.21 A/mm² at 25° C. All E1-E5 pass the cycle life tests. The introduction of HDPE in the polymer matrix of E4 may cause micro-phase separation, and as a result the resistivity is relatively high.

The TtT of E1-E3 for automotive lock motor tests at 85° C., 16V and 20 A are about 8-11 seconds which meet the requirements of TtT>2 s. Although C2 and C3 have TtT greater than 2 seconds, their voltage endurance and hold current are not good. In addition to PVDF, E4 and E5 further contain HDPE, and can be employed for the applications which need not long TtT though their TtT are short. The fluoropolymer, e.g., PVDF, of the PTC material layer may mix with polyethylene and still perform well if the amount of fluoropolymer can dominate the performance of polymer mixture.

In summary, the polymer matrix comprises 50-60%, e.g., 52%, 55% or 58% by volume of the PTC material layer. The conductive ceramic filler comprises 40-45%, e.g., 41%, 43% or 44% by volume of the PTC material layer. The carbon-containing conductive filler comprises 0.5-5%, e.g., 1%, 2% or 4%, of the PTC material layer. Accordingly, a ratio of the hold current to an area of the over-current protection device at 25° C. is 0.21-0.3 A/mm², e.g., 0.23 A/mm², 0.25 A/mm² or 0.27 A/mm², and the over-current protection device can pass the cycle life test of 24V and 50 A without blowout. It exhibits the features of high voltage endurance, high hold current per unit area and high endurable power per unit area. With the endurable voltage increases to 24V, the endurable power per unit area increases to 4.8-7.2 W/mm², e.g., 5 W/mm², 6 W/mm², or 7 W/mm².

The fluoropolymer has a melting temperature higher than 150° C., and is not limited to PVDF. Alternatively, other fluoropolymers having melting temperatures higher than 150° C. and similar features can be used also, such as ethylene-tetra-fluoro-ethylene (ETFE), poly(tetrafluoroethylene) (PTFE), tetrafluoroethylene-hexafluoro-propylene copolymer (FEP), ethylene-tetrafluoroethylene copolymer (PETFE), perfluoroalkoxy modified tetrafluoroethylenes (PFA), poly(chlorotri-fluorotetrafluoroethylene) (PCTFE), vinylidene fluoride-tetrafluoroethylene copolymer (VF-2-TFE), poly(vinylidene fluoride), tetrafluoroethylene-perfluorodioxole copolymer, vinylidene fluoride-hexafluoropropylene copolymer, and vinylidene fluoride-hexafluoropropylene-tetrafluoroethylene terpolymer. E1-E3 employ a plurality of fluoropolymers with different melting temperatures by which a smooth resistance-to-temperature curve (R-T curve) is obtained to enhance the stability of cycle life test and voltage endurance. In an embodiment, the polymer matrix comprises a plurality of fluoropolymers with different melting temperatures in which the highest melting temperature is higher than the lowest melting temperature by 4-15° C. and neighboring melting temperatures have a difference of 3-8° C.

The conductive ceramic filler may be selected from the group consisting of tungsten carbide, titanium carbide, vanadium carbide, zirconium carbide, niobium carbide, tantalum carbide, molybdenum carbide, hafnium carbide, titanium boride, vanadium boride, zirconium boride, niobium boride, molybdenum boride, hafnium boride and zirconium nitride.

The over-current protection device of the present application achieves high endurable voltage, high hold current per unit area and high endurable power per unit area, and therefore it can withstand rigorous impacts in high-temperature environments and is suitable for high-temperature over-current applications.

The above-described embodiments of the present invention are intended to be illustrative only. Numerous alternative embodiments may be devised by persons skilled in the art without departing from the scope of the following claims.

What is claimed is:

1. An over-current protection device, comprising:
   a first electrode layer;
   a second electrode layer; and
   a PTC material layer laminated between the first and second electrode layers and having a resistivity less than 0.05 Ω·cm, the PTC material layer comprising:
      a polymer matrix comprising at least one fluoropolymer with a melting temperature of larger than 150° C., and comprising 50-60% by volume of the PTC material layer;
      a conductive ceramic filler of a resistivity less than 500μΩ·cm dispersed in the polymer matrix, and comprising 40-45% by volume of the PTC material layer; and
      a carbon-containing conductive filler dispersed in the polymer matrix and comprising 0.5-5% by volume of the PTC material layer;
   wherein at 25° C., a ratio of a hold current to an area of the over-current protection device is 0.21-0.3 A/mm²;
   wherein at 25° C., a ratio of an endurable power to the area of the over-current protection device is 4.8-7.2 W/mm².

2. The over-current protection device of claim 1, wherein the fluoropolymer is selected from the group consisting of polyvinylidene fluoride, ethylene-tetra-fluoro-ethylene, poly (tetrafluoroethylene), tetrafluoroethylene-hexafluoro-propylene copolymer, ethylene-tetrafluoroethylene copolymer, perfluoroalkoxy modified tetrafluoroethylenes, poly(chlorotri-fluorotetrafluoroethylene), vinylidene fluoride-tetrafluoroethylene copolymer, poly(vinylidene fluoride), tetrafluoroethylene-perfluorodioxole copolymer, vinylidene fluoride-hexafluoropropylene copolymer, and vinylidene fluoride-hexafluoropropylene-tetrafluoroethylene terpolymer.

3. The over-current protection device of claim 1, wherein the conductive ceramic filler is selected from the group consisting of tungsten carbide, titanium carbide, vanadium carbide, zirconium carbide, niobium carbide, tantalum carbide, molybdenum carbide, hafnium carbide, titanium boride, vanadium boride, zirconium boride, niobium boride, molybdenum boride, hafnium boride and zirconium nitride.

4. The over-current protection device of claim 1, wherein the carbon-containing conductive filler comprises carbon black.

5. The over-current protection device of claim 1, wherein the polymer matrix further comprises high-density polyethylene.

6. The over-current protection device of claim 1, wherein the polymer matrix comprises a plurality of fluoropolymers with different melting temperatures in which the highest melting temperature is higher than the lowest melting temperature by 4-15° C.

7. The over-current protection device of claim 1, wherein the polymer matrix comprises a plurality of fluoropolymers with different melting temperatures in which neighboring melting temperatures have a difference of 3-8° C.

8. The over-current protection device of claim 1, wherein the polymer matrix comprises a plurality of polyvinylidene fluorides with different melting temperatures.

9. The over-current protection device of claim 1, wherein the over-current protection device can pass a cycle life test at 24V and 50 A by 100 cycles without blowing out.

10. The over-current protection device of claim 1, wherein the over-current protection device has a time-to-trip larger than two seconds at 85° C., 16V and 20 A.

* * * * *